Nov. 20, 1923.

C. L. HOFF ET AL
WELDING MACHINE
Filed March 1, 1921

C. L. HOFF ET AL

1,474,824

WELDING MACHINE

Filed March 1, 1921  7 Sheets-Sheet 3

Carlton L. Hoff and
Girardus F. Naugle
Inventors

By Frederick S. Duncan
Attorney

Nov. 20, 1923.

C. L. HOFF ET AL

1,474,824

WELDING MACHINE

Filed March 1, 1921

Patented Nov. 20, 1923.

1,474,824

UNITED STATES PATENT OFFICE.

CARLTON L. HOFF AND GIRARDUS G. NAUGLE, OF YORK, PENNSYLVANIA, ASSIGNORS TO AMERICAN CHAIN COMPANY, INC., A CORPORATION OF NEW YORK.

WELDING MACHINE.

Application filed March 1, 1921. Serial No. 448,761.

*To all whom it may concern:*

Be it known that we, CARLTON L. HOFF and GIRARDUS G. NAUGLE, both citizens of the United States, and both residing at York, Pennsylvania, have invented certain new and useful Improvements in Welding Machines, of which the following, taken in connection with the accompanying drawings, is a specification.

Our invention relates mainly to electric welding machines of the type adapted primarily for welding formed unwelded chain, although as will appear from the description it may be useful in conjunction with machines for welding other kinds of work.

One object of our invention is to provide a machine whereby the links of a formed but unwelded chain may be welded successively.

A further object is to provide electrodes with actuating mechanism such that the electrodes may be advanced sufficiently independently of each other to accommodate themselves to irregularities in the dimensions of the stock of the links and to variation of the two free ends of a link from true alinement with each other.

A further object is to provide an improved construction of welding and swaging or forging mechanism for removing or reducing the bur formed at the weld.

A further object is to provide an improved construction of welding and swaging or forging mechanism, the operation of which will be characterized by a pulsating or hammering action.

A further object is to provide an improved welding and swaging mechanism such that the hammering action is supplemented by such motion relative to the link that the blows are distributed to various parts of the weld.

A further object is to provide a chain feed mechanism adapted to present each link of a chain successively in position to be operated upon.

A further object is to provide a chain feed mechanism whereby the links are successively presented in uniform position for the welding operation.

A further object is to provide a means for securely retaining the successive links uniformly in the same position.

Another object is to provide a swaging mechanism such that the swaging tools will have an oscillating or rocking motion with respect to the link, the latter, if desired, remaining stationary during the swaging.

Another object is to provide a machine for welding formed chain automatically if desired.

Referring to the drawings.

The machine includes the usual bed 1 on which the operating parts are mounted and the bed may be supported by the usual standards 2. Suitable means are provided for firmly securing a link while the several operations hereinafter to be described are performed upon it. This means may consist of a clamp comprising a stationary adjustable insulated clamp jaw 3 and an insulated movable clamp jaw 4, the stationary clamp jaw 3 being provided with a pair of upstanding studs 5, 5 recessed to fit the curved end of a link, and the movable clamp jaw 4 being provided with a pair of similar studs, 6, 6 similarly but oppositely recessed, the two pairs of studs being oppositely disposed with respect to each other, whereby a link may be firmly held by them when the movable clamp jaw is brought to given proximity to the stationary clamp jaw. The movable clamp jaw is slidably mounted in an insulated guideway 7 whereby it may be moved toward and away from the stationary jaw by the motion of the clamp jaw lever 8. The clamp jaw lever 8 is pivoted at 9 in the bearing 10, and one end of this lever, namely that which actuates the movable clamp jaw is preferably provided with an adjustment screw 11 whereby the limit of motion of the movable clamp jaw in the direction of the fixed clamp jaw may be minutely varied as adjustment may be required to correct errors or to accomodate various sizes of links or otherwise.

Figure 4:
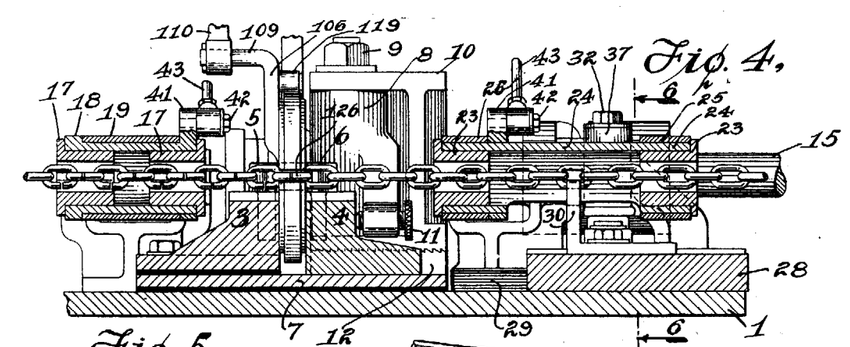
Figure 4 is an elevation partly in section on the line 4—4 of Figure 1.

Adjustment of greater magnitude may be effected by making the bearing 10 horizontally adjustable, which is suitably done by mounting it on the serrated surface of a block 12, the bottom surface of the bearing being likewise serrated to correspond as shown in Figure 4, whereby the bearing may be moved if desired but is otherwise retained rigidly at any given position. The roller 13 on the end of the jaw lever 8 is in operative contact with the cam 14 mounted on the main shaft 15, and by the revolution of the cam is caused to oscillate in a horizontal plane, whereby the movable clamp jaw is given a reciprocating motion co-ordinated with the motion of the other parts, as will be hereinafter more fully described. Rearward motion of the movable clamp jaw is effected by the spring 16, connecting the jaw with the bed.

Figure 1:
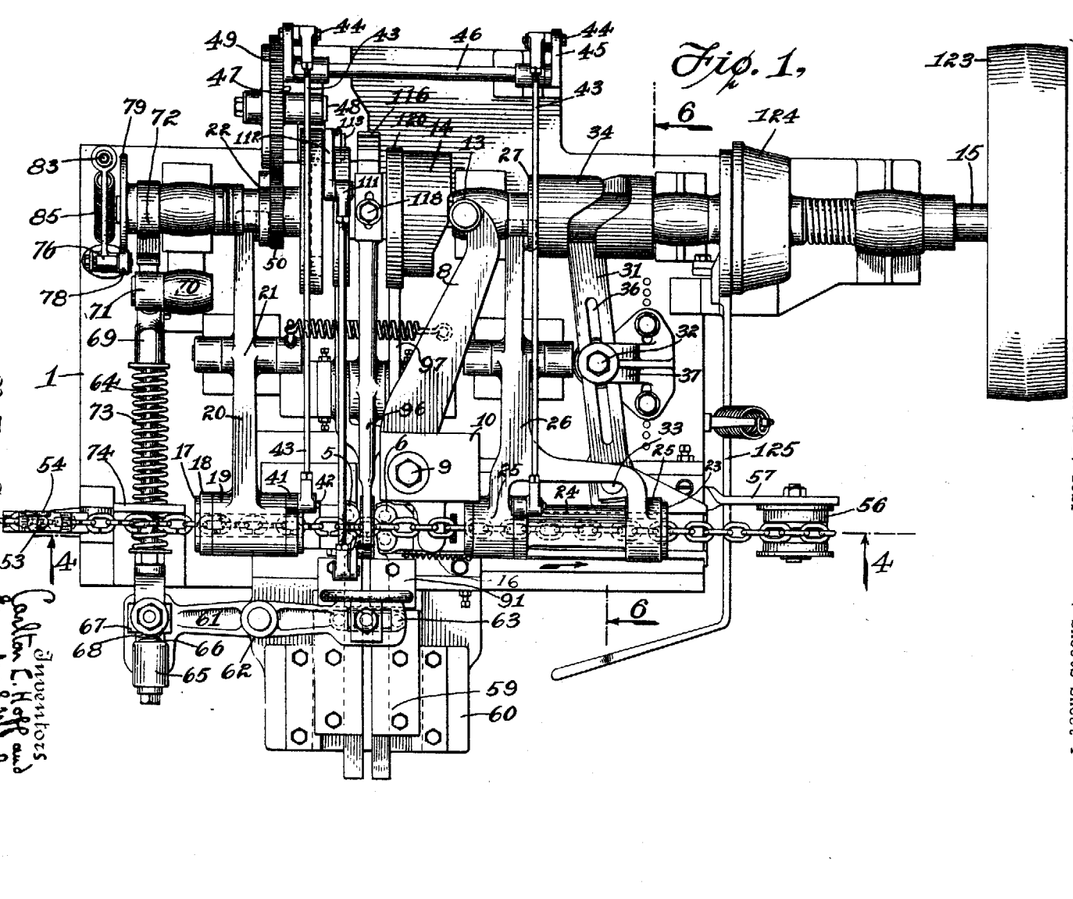
Figure 1 is a plan view of the machine.
Figure 2:
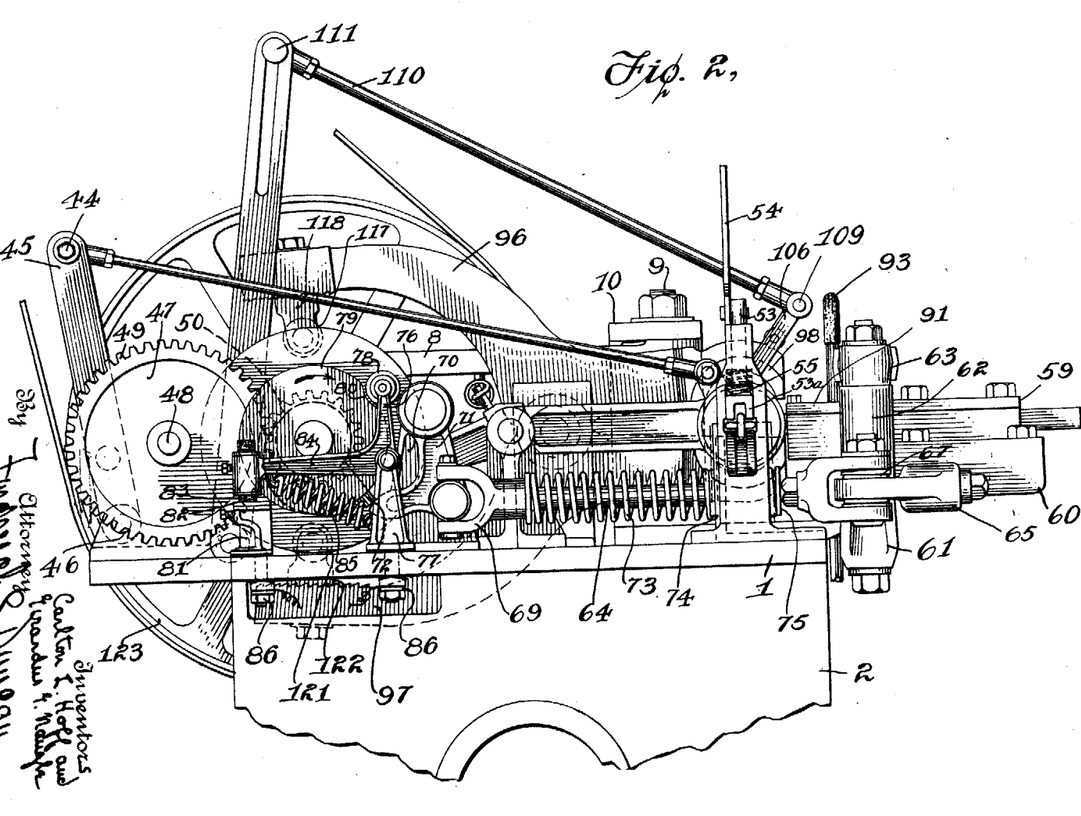
Figure 2 is a side view in elevation.
Figure 3:
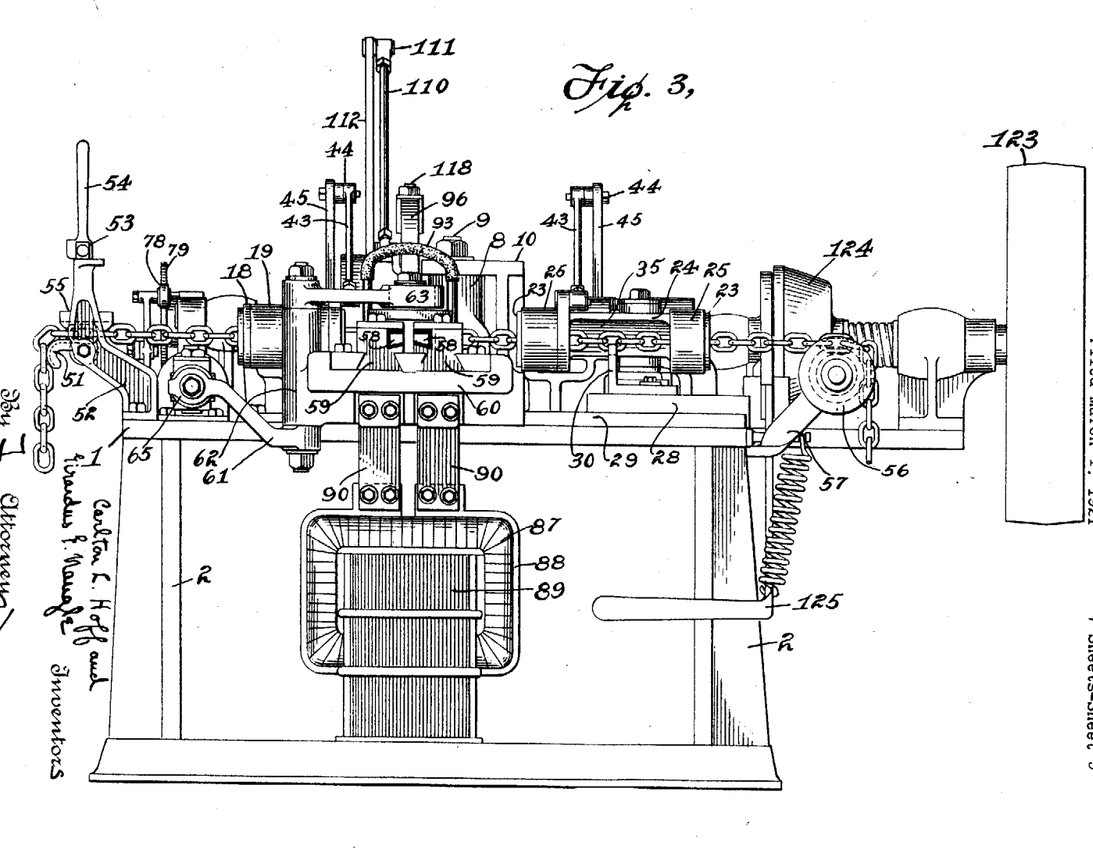
Figure 3 is a front elevation.

In the preferred embodiment of the invention as shown in the accompanying drawings, a machine is shown adapted to weld successively each link of the type of chain in which alternate links are split on the same side of the chain, the split in each link being approximately midway between the ends, as shown in Figure 1.

At the moment of completion of all of the operations upon any given link the chain is so positioned that the link lies normally between the clamp jaws. Therefore, before the chain can be advanced to place the next succeeding link in position to be operated upon, there must be a relative movement as between the clamp and the chain whereby the latter shall be unobstructed in its advance. This result is preferably accomplished by opening the clamp and moving the chain away from it, preferably in an upward direction.

The chain may be fed and its angular position with reference to its axis controlled by passing it in the direction of the arrow (Figure 1) through cruciform dies, located on either side of the clamp. The dies on one side of the jaws as indicated by the numerals 17, 17 and which will be referred to as the left hand dies, are enclosed by a sleeve 18 which is rotatably supported by the bearing 19 which in turn is carried by the elevating arm 20 pivotally connected with the bed at 21, the other end of the arm having operative contact with the cam 22. The cam 22 is shaped and timed to raise and lower the bearing 19 and consequently the dies 17, 17 and the end of the section of chain carried by them in co-ordination with the motions of the other parts.

Similarly on the other side of the jaws are the cruciform dies 23, 23, which may be referred to as the right hand dies and which are retained by the sleeve 24 which in turn is rotatably mounted in the bearings 25, 25 carried by the bifurcated arm 26. The opposite end of the arm 26 has contact with the cam 27, whereby, as in the case of the arm 21, the bearings 25 and the end of the chain carried by them are raised and lowered in co-ordination with the movements of the other parts of the machine.

The motion of the right hand set of dies varies somewhat from that of the left hand set. Their upward limit of movement is preferably the same, and from a position in which the chain is approximately level with the bed, the upward motions of both sets of dies are synchronous and coterminous as likewise their downward motions to this position. The position last mentioned we term for convenience the semi-elevated position of the dies, although it is in fact the lowest position of the left hand dies. When both sets of dies have reached the semi-elevated position, however, the right hand dies continue downwardly until the chain engages with the grab or feed hook 30 whereby it is advanced or fed by the motion of the latter, as will be further described. The right hand dies are then returned to semi-elevated position, the chain then being out of engagement with the hook.

Figures 5, 6:
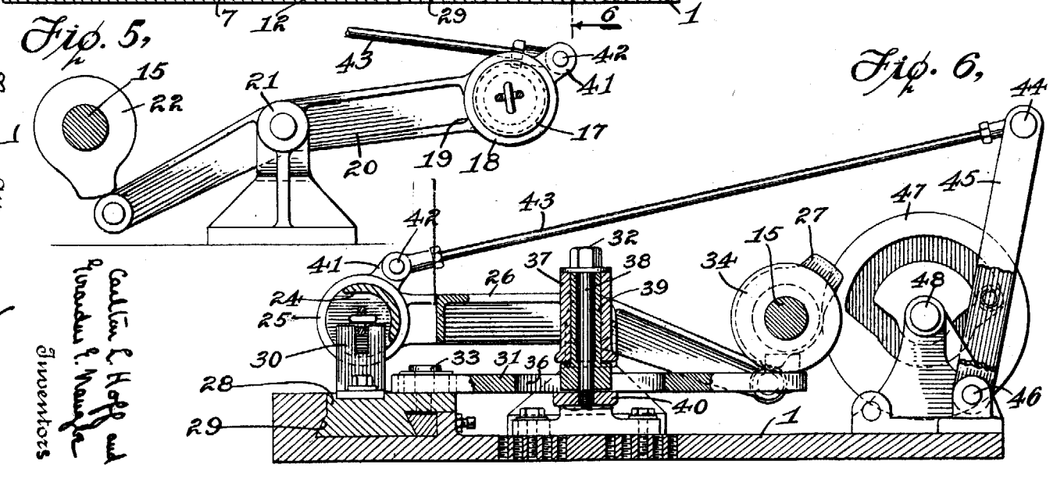
Figure 5 is an elevation of the left hand chain lifting mechanism.
Figure 6 is a detail sectional elevation on the line 6—6 of Figure 1, looking in the direction of the arrows, showing the right hand chain lifting mechanism.

Any suitable mechanism may be employed for advancing the chain the required distance at the completion of each cycle of operations. For instance, the carriage 28 slidably mounted in the guideway 29 may carry an upstanding fork 30 in which a vertically disposed link of the chain may slidably fit and whereby the succeeding horizontally disposed link may be gripped and the chain drawn or advanced the required distance as the carriage 28 moves in the guideway. As in the particular machine illustrated the links are to be operated upon in succession this distance is of course equal to the pitch of the chain. The carriage may be caused to reciprocate by any suitable means, such as the lever 31, pivotally connected with the bed at 32 and pivotally and slidably connected to the carriage 28 at 33. The opposite end of the lever may be controlled and the desired reciprocating motion given by operative contact with the peripheral cam 34 mounted on the main shaft 15. The sleeve 24 is provided with a longitudinal aperture 35 in the lower portion of its periphery to permit travel of the hook without interference, the aperture being sufficiently wide to permit the sleeve to rotate in an arc of 90 degrees. For varying the extent of feed it is convenient to make the lever 31 adjustable longitudinally of itself in its fulcrum, which may be done by making it slotted as indicated at 36, and suspending it from the bracket 37 by means of the bolt 38, the bushing 39 and the nut 40 (Figure 6).

As the links to be operated upon are preferably presented in uniform position, which position in the machine as shown is horizontal, means are provided for rotating the chain on its longitudinal axis prior to its being seated in the clamp, an angular distance sufficient to cause each link to lie in a horizontal position while the necessary operations are being performed upon it. Since we have illustrated a machine adapted to operate in a chain of the type in which the splits in alternate links are uniformly positioned with respect to the chain itself, the positioning of each succeeding link requires only a quarter turn, that is, a turn of 90 degrees. As above described, the cruciform dies are retained by sleeves which are rotatably mounted in bearings carried by arms 20 and 26 whereby the chain may be raised and lowered from the horizontal plane of the studs. The rotation of the chain may take place at any time after it has cleared the studs. To effect this, the sleeves are provided with arms 41, 41 which are pivotally connected at 42, 42 to links 43, 43 which in turn are pivotally connected at 44, 44 to levers 45, 45 pivotally connected at 46, 46 to the bed of the machine. The proper motion to actuate the levers 45, 45 is imparted by the cams 47, 47 mounted on the half-time shaft 48 which has operative connection with the main shaft 15 through the gears 49 and 50, the gear 49 being if desired located on the periphery of one of the cams 47. The cams 47 are shaped and timed to cause the cruciform dies to rotate the chain in opposite directions a quarter turn alternately during each successive cycle of operations.

To facilitate even motion of the chain while being fed it is convenient to guide it into the dies by means of a guide lip 51 supported by the bracket 52 mounted on the bed of the machine. The tension of the chain may be maintained by the plunger 53, carrying the bifurcated block 53ª, and it may be raised and lowered on the chain by the cam lever 54. The block is normally maintained against the chain by the pressure of the spring 55. The welded chain may be discharged over the pulley 56 mounted on the bracket 57 which in turn is supported by the bed of the machine.

As each link is held by the clamp jaws and presented in position to be operated upon, the electrodes 58, 58 are brought in contact with it, one on each side of the split in the link, whereby a circuit through the abutting ends is made. This may be accomplished in any convenient manner. The electrodes may be separately mounted in carriages 59, 59 slidably mounted in the bracket 60, whereby they may be evenly advanced and retracted as required. The mechanism for advancing and retracting the electrodes may consist of a lever 61 pivotally mounted in the bracket 62. One end of the lever is connected to the two carriages through the medium of the equalizing link 63 (shown in dotted lines Figure 1) whereby a certain degree of independent motion is permitted the electrodes to allow for variations in alinement of the two free ends of the link being operated upon or irregularities in the stock from which the chain is formed. The lever 61 is resiliently and pivotally connected to the rod 64. The barrel 65 retains the spring 66 which bears against the block 67 slidably mounted in the slot 68 in the end of the lever 61. The block 67 is pivotally carried on the end of the rod 64, having at its opposite end the yoke 69.

Pivotally mounted on a bracket 70 on the bed is the pawl 71 co-operating with the wiper cam 72 mounted on the main shaft and shaped and timed to advance the electrodes to close the circuit through the abutting ends of the link at the proper time. The pawl, which may have the general shape of a bell crank lever, has universal connection with the yoke 69, and is normally maintained against the wiper cam by a compression spring 73 seated against the bracket 74. Another spring 75 may also be seated against the opposite side of the bracket 74 to take the rebound of the rod 64 when the electrodes are retracted.

The circuit may be opened and closed at the proper times by any suitable means. For instance, the bell crank lever 76 pivotally mounted on the insulated bracket 77 mounted on the bed is provided with a roller 78 of insulating material in co-operative relation with the peripheral cam 79 provided with the depression 80. Another insulated bracket 81 is also mounted on the bed and carries the contact point 82, which makes connection with the contact point 83 carried by the end of the bell crank lever 84. The points are normally maintained in contact by a tension spring 85 connecting the end of the bell crank lever with the bracket 77. When the roller 78 is in the depression 80 the circuit is closed, this taking place when the electrodes are in advanced position. Suitable terminals 86, 86 are also provided whereby the proper connection with the make and break mechanism may be made. Connection from these terminals may, if necessary, be made with a stepdown transformer containing the usual primary coil 87, secondary coil 88 and core 89. From the transformer the connection is made with the electrodes by means of the flexible conductors 90, 90 which connect with the conductors 91, 91 carried by the electrodes. As the electrodes tend to heat excessively when the machine is in operation it is advisable to keep a current of cooling water passing in proximity to them which may be done by providing the conductors 91, 91 with chambers 91ª and 91ᵇ which surround the electrodes and through which a current of water passes. One of the chambers, for instance 91ª, may be connected with a source of water supply by the pipe 92 and may be supplied with an outlet 92ᵃ. The water circuit may be completed by the pipe 92ᵇ leading into the chamber 91ᵇ which is provided with an outlet 92ᶜ. The pipes 92ª and 92ᵇ may be connected by a rubber hose 93, which allows for independent motion of the electrodes.

When the welding operation has been completed and while the link is firmly held by the clamp the bur resulting from the welding operation is reduced or removed. This operation is performed by closing upon the bur two complementary dies or swages 94 and 95, the former having a bearing in the jaw 96, and the latter a bearing in the jaw 97. The swages are respectively mounted in semi-circular swage-holders 98 and 99 which are fitted to oscillate in semi-circular bearings in the jaws as shown, and functionally considered, the swages are integral parts of the holders. When the jaws 96 and 97 which act as supports or carriers for the swages are closed and the swages brought together the two swage holders constitute a unit swage and may be oscillated as such in the bearing formed by the two complementary semi-circular bearings in the jaws. The swage holders are provided with complementary recesses so that when they are brought into co-operation the recess 100 is formed whereby the two holders may be rotated as a unit on and about a joint in an arc of considerable magnitude. The jaws are pivoted in such manner as to allow a certain degree of play, the purpose of which will be hereinafter described and are normally maintained apart by the tension spring 101 having connections at 102, 102. The closing motion of the jaws is timed to bring the swages into co-operation immediately the welding operation has been completed and while the link operated upon is being firmly held between the studs.

Each holder is provided with flanges 103 whereby it is retained against lateral displacement on its bearing. To prevent the lower holder from being dislocated from its bearing when the jaws are open, it may be provided with half spherical sockets 104, 104, which may be adapted to retain two balls 105, 105 (shown in dotted lines) which travel along the half round groove 105 (one shown in dotted lines) located in the inner wall of the flange and concentric with the axis of rotation of the die.

Figures 7, 8, 9, 10, 11:
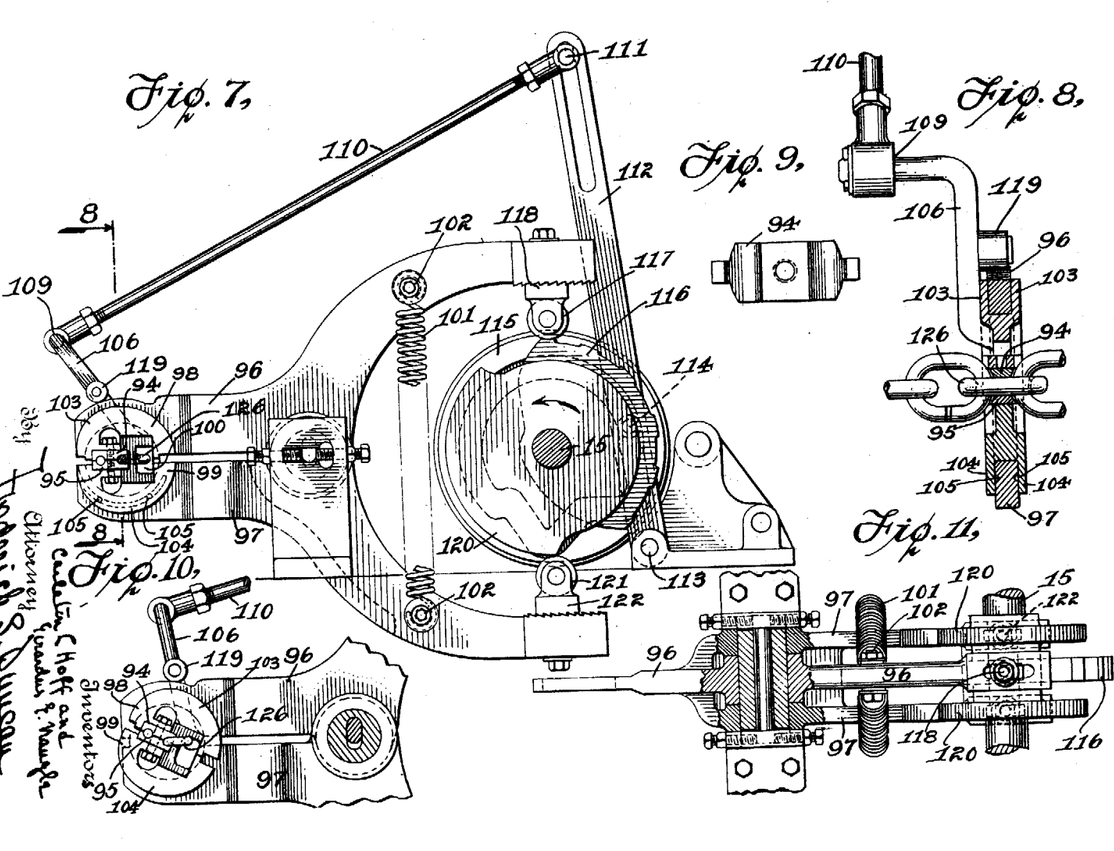
Figure 7 is a detail side elevation of the swaging bur trimming and reducing mechanism.
Figure 8 is a detail enlarged view, partly in section, on the line 8—8 of Figure 7.
Figure 9 is a detail view of one of the dies carried by the bur trimming and removing mechanism.
Figure 10 is a detached view, partly in section, showing the bur trimming and reducing mechanism with the parts positioned at one of the extreme limits of oscillation.
Figure 11 is a plan view partly broken of the swaging bur trimming and reducing mechanism, the mechanism for oscillating the bur trimming and reducing dies being omitted.
Figures 12, 13, 14:
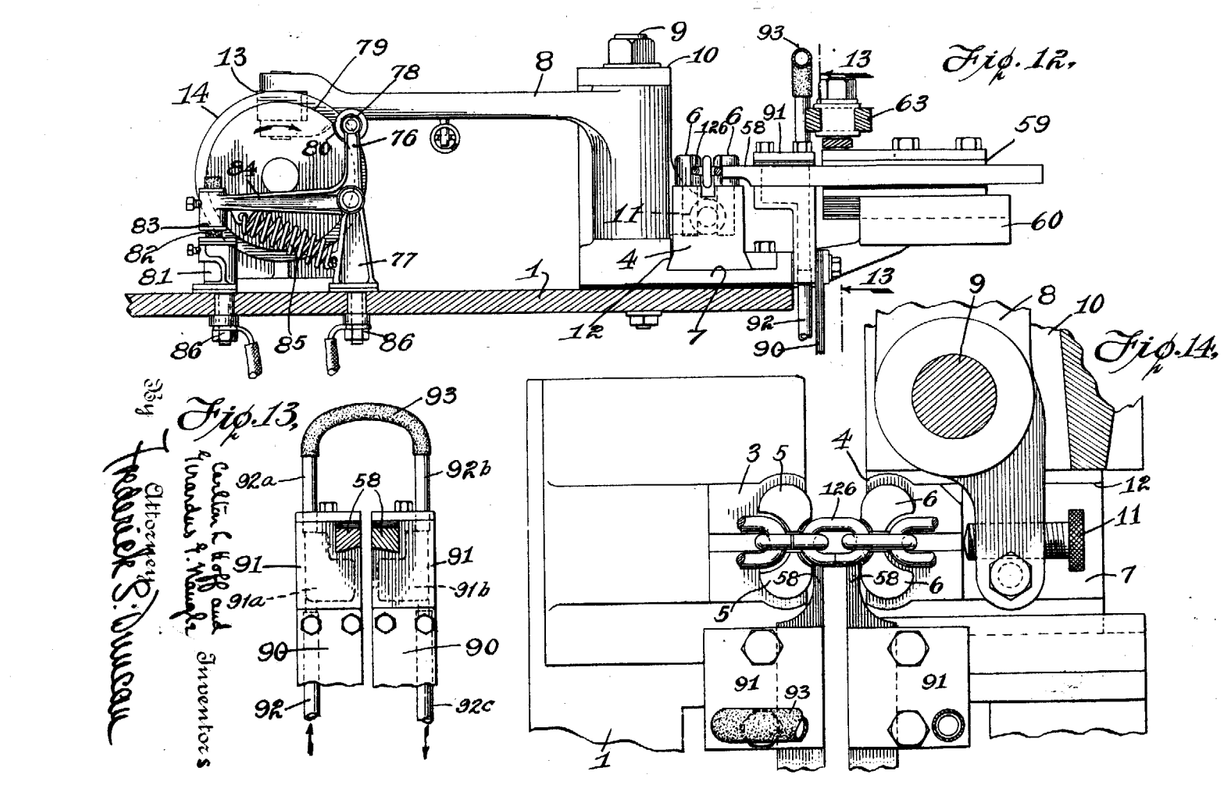
Figure 12 is an enlarged side elevation of the mechanism for operating the movable clamp jaws.
Figure 13 is a front sectional elevation on the line 13—13 of Figure 12.
Figure 14 is an enlarged detail plan view of the link-holding clamp and electrodes.

Any suitable means may be provided to effect the proper oscillation of the unit swage. These means may consist of the lever or crank arm 106 projecting from the upper holder 98 and pivoted at 109 to the link 110, which in turn is pivoted at 111 to the cam lever 112. The cam lever is pivotally connected to a fixed portion of the machine, as, for example at 113, and is provided with a roller 114 (shown in dotted line), which travels in and is propelled by the path cam 115 mounted on the main shaft 15. The cam as shown in the drawings, particularly in Figure 7, is formed and timed to oscillate the swage five strokes in each cycle of operations starting from zero position, (that is, the position shown in Figure 7) and returning thereto. While the oscillation of the swages is going on, we prefer to supplement their action by a hammering or pulsating action. The latter action is secured by the use of the peripheral cam 116 having teeth thereon as shown in Figure 7. Operative connection with this cam and the jaw 96 is secured by the roller 117 mounted on the jaw 96 by means of the adjustable bearing 118. The rotation of this cam produces a pulsating pressure of the upper swage 94 which may reach such a degree of intensity as to include what may properly be described as hammering. The lever 106 may carry a roll 119 positioned to travel on a track formed by the outer perimeter of the bearing carried by the upper jaw whereby the upper holder is retained at all times in its bearing.

The cam which controls the lower jaw 97 is indicated by the numeral 120 and is shaped so that the roller 121 which is mounted on the jaw 97 by means of the adjustable bearing 122 travels thereon in fixed position axially of the cam while the oscillation is going on, whereby the lower swage acts as an anvil to receive the blows or pulsations of the upper swage. The cams 116 and 120 are formed so that between two successive bur removing operations the two complementary swages will be sufficiently retracted from each other to permit the advance of the electrodes and the operation of the feeding and turning mechanism.

Power may be imparted to the machine by any suitable means such as the pulley 123 mounted on the main shaft. The clutch 124 is also mounted in the main shaft and is controlled by a lever 125 the handle of which is located in front of the machine so that it will be convenient to the hand of the operator.

Figure 15:
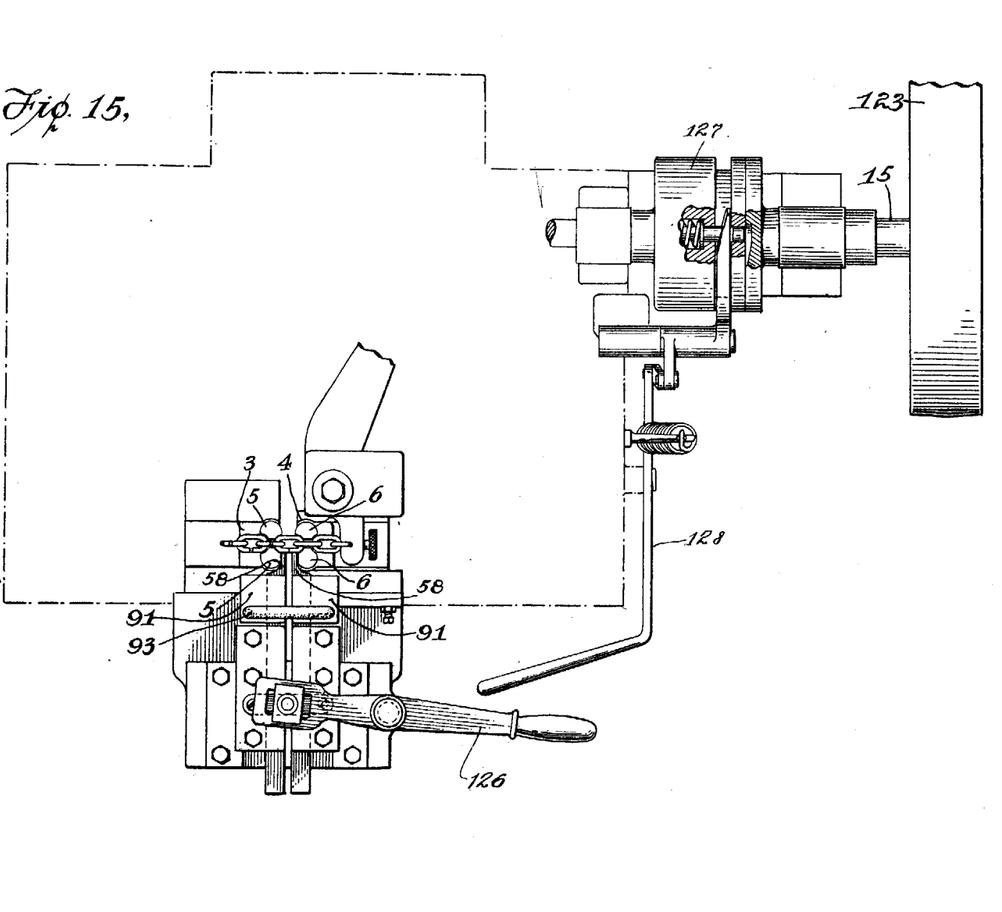
Figure 15 is a plan view of certain parts showing a modification in which the movement of the electrodes is hand controlled.

It is frequently and in practice perhaps generally the case that the electrical conductivity and other electrical properties of various specimens of a lot of articles vary to such a considerable extent that it is not feasible to apply the current for a uniform period of time for all, as is done by the pulley automatic chain forming machine which we have hereinbefore described. For instance, to consider a chain, a link of low resistance must be kept in contact with the electrodes for a longer period than one of high resistance in order that the effect may be uniform as to all links, and as the period of contact for a given link depends much on human judgment, we have devised the modifications illustrated in Figure 15. In Figure 15 the period of contact of the electrodes is wholly under the control of the operator, the automatic circuit timing mechanism and the mechanism for advancing and retracting the electrodes in coordination with the remaining operating parts being omitted, other means of bringing these parts into operation as desired by the operator being employed. For controlling the electrodes, it is convenient to provide a hand lever 126, and eliminate the circuit timing device, the circuit being closed at all times with the exception of the path between the electrodes.

As the periods of contact with the various links differ for the reasons above stated, it is, of course, desirable that the operating parts of the machine cease motion while the electrodes are in contact and for as long a period as is desired. We therefore provide in our modified form a one revolution clutch 127 of any suitable type, the clutch being timed and adjusted to stop the operating parts when a link has been securely located between the clamp jaws ready for the application of the electrodes and to cause the parts to resume operation upon manipulation of the hand lever 128. As one revolution clutches are well known mechanical devices, we have not deemed it necessary to describe them in detail. It is sufficient to say that the preferable form for my particular use is one so adjusted that a cycle begins following the placing of a link in position for welding and is completed upon the placing of the next succeeding link in position for welding, the welding taking place between the completion of one cycle and the commencement of the next succeeding cycle. Of course, it is obvious that we employ a clutch which completes a cycle in one revolution only, merely for the reason that the main shaft 15 completes a cycle during the same time.

It will also be obvious that even though the electrodes be hand operated the one revolution clutch may be entirely omitted, if desired, the cams being timed to allow the ling to remain between the clamp jaws for a period that will be a maximum for all links and sufficient for the proper welding of any links upon which the machine is likely to operate. This construction is not, however, under all circumstances as desirable as that which employs the one revolution clutch since much time may needlessly be lost in the welding of those links which, relatively to the others, are good electrical conductors.

The operation of the machine shown in Figures 1 to 14 inclusive is as follows:

Assume that any link such as the link 126 has been completely operated upon; that is to say, the free ends have been welded together, the bur removed or reduced, and the complementary dies withdrawn to retracted position. At this stage the cruciform dies 17 and 23 are both at the same elevation with respect to the bed of the machine, that is, approximately on a level with the horizontal link 126.

The movable clamp jaw then retracts and the chain is elevated to its highest position. Before the elevating has been completed the two operations of rotating the chain and the backward feed of the fork commence. Before the completion of these two motions the lowering of the chain commences and the chain is brought to its semi-elevated position about the time of completion of these two motions. The right hand end of the chain however continues downwardly till it engages with the hook. The hook then feeds the chain forwardly a distance of one link and the right hand elevating arm returns to the semi-elevated position, the newly positioned link having been clamped between the clamp jaws during the return to semi-elevated position. Immediately following the closing of the clamp jaws the electrodes advance and as the circuit is closed and the link heated a further movement of the movable clamp takes place fusing the two free ends of the link together. The electrodes then are retracted and while the link is still held firmly by the clamp the swages come into operation. When the swaging has been completed the completed link is released from the jaws of the swaging mechanism and the same cycle of operations is repeated for each link of the chain.

It is intended that the swages shall preferably be brought into operation as soon as the union of the ends of the link is accomplished. The action of the swages is preferably partly a combination of hammering or pulsating and swaging, with the consequence that the strength of the weld is much increased over the result that would be accomplished merely by the heating of the ends and pressure by the clamp. In addition there may be certain amount of cutting by the edges of the swages which produces a smooth symmetrically proportioned link without noticeable irregularities.

Modifications of our invention will readily suggest themselves to those skilled in the art without departing from the spirit of our invention, and we do not, therefore, intend to limit ourselves to the particular details of construction herein illustrated or described, but we claim that our invention is as follows:

1. In an electrical welding machine, a pair of slideways, electrodes mounted in said slideways, an equalizing link connecting said electrodes, and a power imparting member pivotally connected with said equalizing link at a point intermediate the connections therewith with said electrodes.

2. In an electrical welding machine, a pair of slideways, means for securing the object to be welded, a pair of carriages mounted in said slideways, electrodes mounted on said carriages, an equalizing link pivotally connecting said carriages, a lever pivotally connected to said link at a point intermediate its connections with said carriages, and means for imparting intermittent reciprocatory motion to said lever.

3. In an electric chain welding machine, a pair of slidably mounted electrodes, means for advancing said electrodes to a predetermined welding position and retracting them therefrom at periodic intervals, means for closing an electric circuit through said electrodes when in advanced position, and means for presenting a link in position to be welded at each advance of said electrodes.

4. In an electric chain welding machine, a pair of slidably mounted electrodes, means for advancing said electrodes to a predetermined position and retracting them predetermined intervals, means for closing an electric circuit through said electrodes when in advanced position, and means for presenting a link in position to be welded at each advance of said electrodes.

5. In an electric chain welding machine, a pair of independently slidably mounted electrodes, means for advancing said electrodes to a predetermined position and retracting them at periodic intervals, means for closing an electric circuit through said electrodes when in advanced position, and means for presenting a link in position to be welded at each advance of said electrodes.

6. In an electric chain welding machine, a pair of independently slidably mounted electrodes, an equalizing link connecting said electrodes, means operating on said equalizing link for advancing said electrodes to a predetermined position and retracting them from said position at periodic intervals, means for closing an electric circuit through said electrodes when in advanced position, and means for presenting a link in position to be welded at each advance of said electrodes.

7. In an electric chain welding machine, a pair of independently slidably mounted electrodes, an equalizing link connecting said electrodes, a lever pivotally connected with said equalizing link, means operating through said lever for advancing said electrodes to a predetermined position and retracting them therefrom at periodic intervals, means for closing an electric circuit through said electrodes when in advanced position, and means for presenting a link in position to be welded at each advance of said electrodes.

8. In an electric chain welding machine, a pair of independently slidably mounted electrodes, an equalizing link connecting said electrodes, a lever pivotally connected with said equalizing link, means operating through said lever for advancing said electrodes to a predetermined welding position and retracting them therefrom at predetermined intervals, an electric circuit connected with said electrodes, a make and break timing mechanism in said circuit, means for contacting said make and break timing mechanism when the electrodes are in advanced position and breaking the same when they are in retracted position, and link positioning means for placing a link in position to be welded while said electrodes are in advanced position, and means for bringing the ends of said link in abutment at the same time to close a circuit therethrough.

9. In an electric chain welding machine, a pair of movably mounted electrodes, means for advancing said electrodes to a predetermined position and retracting them therefrom at predetermined intervals, an electric circuit connected with said electrodes, means for closing said circuit through electrodes after the advance thereof, and means for presenting a link in position to be welded while said electrodes are in advanced position.

10. In a welding machine, a movable swage support, a swage provided with a working surface arcual in cross section, said swage being rotatably mounted on said support, and said working surface being substantially co-axial with the axis of rotation of said swage, means for advancing and retracting said support and with it said swage to and from a predetermined position, and means for causing rotation of said swage in its bearings while the said support is in advanced position.

11. In a welding machine, a movable swage support, a swage provided with a concave working surface arcual in cross section, said swage being rotatably mounted on said support and said working surface being substantially coaxial with the axis of rotation of said swage, means for advancing and retracting said support and with it said swage to and from a predetermined position, and means for causing rotation of said swage in its bearings while said support is in advanced position.

12. In a welding machine, a movable swage support, a swage provided with a concave working surface arcual in cross section, said swage being rotatably mounted on said support and said working surface being substantially coaxial with the axis of rotation, means for advancing and retracting said support and with it said swage to and from a predermined position, a radially projecting crank arm on said swage, and means operating on said arm for causing rotation of said swage while said support is in advanced position.

13. In a welding machine, a pivoted arm carrying a rotatably mounted swage, said swage being provided with a concave working face arcual in cross section and coaxial with the axis of rotation of said swage, means for swinging said pivoted arm to and from a predetermined position, and means for causing rotation of said swage while said support is in advanced position.

14. In a welding machine a pivoted arm carrying a rotatably mounted swage, said swage being provided with a concave working face arcual in cross section and coaxial with the axis of rotation of said swage, means for swinging said pivoted arm to and from a predetermined position, a radially projecting crank arm on said swage, and means operating on the free end of said crank arm for causing rotation of said swage while said arm is in said predetermined position.

15. In a welding machine a pair of movable supports adapted to move toward and away from each other, each of said supports being provided with bearings in which are mounted the complementary members of a swage, means for advancing and retracting said supports, and means for causing rotation of said swage in said bearings while said support is in advanced position.

16. In a welding machine, a carrier provided with a bearing in which is rotatably mounted a swage provided with a concave cylindrical working surface substantially coaxial with the axis of rotation of said swage, said carrier being adapted to advance and retract to and from a predetermined position, and means for causing said swage to rotate in said bearing while in said predetermined position.

17. In a welding machine a movable swage support provided with a bearing, a swage rotatably mounted in said bearing, said swage being provided with a working surface arcual in cross section and substantially coaxial with the axis of rotation of said swage, means for causing said support to advance to and retract from a predetermined position, and means for causing said swage to rotate in said bearing while in said predetermined position.

18. In a welding machine a movable swage support provided with a bearing, a swage rotatably mounted in said bearing, said swage being provided with a working surface arcual in cross section and substantially coaxial with the axis of rotation of said swage, means for causing said support to advance to and retract from a predetermined position, a radially projecting crank arm on said swage, and means actuating said arm to cause rotation thereof while the said support is in said predetermined position.

19. In a welding machine means for securing a part having a welded joint of arcual cross section, a carrier provided with a bearing in which is rotatably mounted a swage, the working surface of which is of arcual cross section and coaxial with the axis of rotation thereof, said carrier being adapted to move to bring said swage into concentric relation and in contact with said joint, and means for rotating said swage in its bearing while thus positioned.

20. In a welding machine means for securing a part having a welded joint of arcual cross section, a carrier provided with a bearing in which is rotatably mounted a swage, the working surface of which is of arcual cross section and concentric with the center of rotation thereof, said carrier being adapted to move to bring said swage into concentric relation with said joint, a crank arm on said swage, and means actuating said crank arm to cause rotation of said swage while in said concentric relation.

21. In a welding machine means for securing a part having a welded joint, a pair of swage supports each of which carries a rotatably mounted swage member, the said members being complementary to each other, means operating through said supports to close said swage members on said joint, and means for causing the unit swage to rotate on and about said joint while thus closed.

22. In a welding machine means for securing a part having a welded joint, a pair of supports each of which carries a rotatably mounted swage member, the said members being complementary to each other, means operating through said supports to close said swage members on said joint, a crank arm on one of said members, and means operating through said crank arm to cause the unit swage to rotate on and about said joint while thus closed.

23. In a welding machine means for securing a part having a welded joint, a pair of pivotally mounted jaws each of which carries a rotatably mounted swage member, the said members being complementary to each other, means operating through said jaws to close the swage members on said joint, and means for causing the unit swage to rotate about and on said joint while thus closed.

24. In a welding machine, means for securing a part having a welded joint, a pair of pivotally mounted jaws each of which carries a rotatably mounted swage member, the said members being complementary to each other, means operating through said jaws to close said swage members on said joint, a crank arm on said swage, and means operating through said crank arm to cause said swage to oscillate on said joint while thus closed.

25. In a welding machine, means for securing a part having a welded joint, a pair of pivoted jaws, a swage member rotatably mounted in each of said jaws, the working surfaces of each of said members being cylindrically concave and complementary to each other, means operating through said jaws to close said swage members on said joint, and means for causing the unit swage to oscillate about and on said joint while thus closed.

26. In a welding machine, means for securing a part having a welded joint, a disk-shaped swage composed of two complementary segmental members, the working surface of said members being concentric with said disk-shaped swage, a pair of pivoted jaws each having at its free end a bearing adapted to receive one of said members whereby the same are mounted to rotate on their perimeters, radially extended flanges on said members whereby lateral play of the same in their bearings is prevented, means for closing said jaws and consequently said swage members on a joint to be swaged, a crank arm on one of said members, a roller on said crank arm co-operating with a circular track concentric with said swage whereby the said member is prevented from being dislocated radially from its bearings, means operating through said crank arm to impart oscillatory motion to said swage when the said members are in cooperative relation, a ball socket in the inner face of one of the flanges of the other of said members, a cooperating ball race in the adjacent side of the jaw in which the said member is mounted, a ball seated in said socket whereby said member is prevented from being dislocated from its bearings, and means for causing said jaws and consequently said swage members to close upon said joint and to be withdrawn therefrom.

27. In a welding machine, means for securing a part to be welded, a pair of opposing swage members together forming a unit swage, means for closing said swage members on a joint to be swaged, and means for imparting oscillatory motion to said swage on and about said joint while thus closed thereon.

28. In a welding machine, a unit swage composed of two complementary members, the swaging surface being composed of registering recesses in each of said members, a bearing for said swage whereby the same is adapted to rotate about a joint to be swaged, a crank arm on one of said members and means operating through said crank arm to cause rotation of said swage.

29. In a welding machine, means for securing a chain link against movement, a pair of segmental swage members having registering swaging surfaces in the chordal portions of their perimeters, the said swaging surfaces being arcual in cross-section and having a common center and also eccentrically located cut-away portions in the chordal section of the perimeter of one of said members, a pair of pivoted jaws, in each of which is rotatably mounted one of said swage members, said jaws having shanks, cams co-operating with said shanks to close said jaws and consequently said members on a joint to be swaged, the camming surfaces of said cams being provided with small elevations adapted to alternately increase and decrease the pressure of said swage members on said joint; a crank arm on one of said members, a link connected with said crank arm, and means operating through said link to impart oscillatory motion to said swage while thus closed on said joint.

30. In a welding machine, means for securing a chain link against movement, a pair of segmental swage members having registering swaging surfaces in the chordal portions of their perimeters, the said swaging surfaces being arcual in cross-section and having a common center and also eccentrically located cut-away portions in chordal portion of the perimeter of one of said members, a pair of pivoted jaws, in each of which is rotatably mounted one of said swage members said jaws having shanks, cams co-operating with said shanks to close said jaws and consequently said members on a joint to be swaged, the camming surfaces of said cams being provided with small elevations adapted to alternately increase and decrease the pressure of said swage members on said joint, and means for causing oscillatory motion of the unit swage while thus closed on a joint.

31. In a welding machine, means for securing a chain link against movement, a pair of segmental swage members having registering swaging surfaces in the chordal portions of their perimeters, the said swaging surfaces being arcual in cross-section and having a common center and also eccentrically located cut-away portions in the chordal portion of the perimeter of one of said members, a pair of pivoted jaws in each of which is rotatably mounted one of said swage members said jaws having shanks, cams co-operating with said shanks to close said jaws and consequently said members on a joint to be swaged, the camming surfaces of said cams being provided with small elevations adapted to alternately increase and decrease the pressure of said swage members on said joint.

32. In a welding machine, a rotatably mounted swage composed of two segmental sections complementary to each other and having the swaging surface concentric with the unit swage, a movable support for each of said members and in which the said members are rotatably mounted, means for closing said supports and consequently said swaging surfaces on a joint to be welded whereby pressure is applied to said joint, and means for imparting a succession of pulsations to said pressure.

33. In a welding machine, a rotatably mounted swage composed of two segmental sections complementary to each other, and having the swaging surface concentric with the unit swage, a movable support for each of said members and in which the said members are rotatably mounted, means for closing said supports and consequently said swaging surfaces on a joint, means for imparting a succession of pulsations to said pressure, and means acting simultaneously with said pressure for causing the said swage to rotate as a unit in the bearings in said supports.

34. In a welding machine, means for securing a part having a welded joint, a pair of movable swage supports, each carrying one of the complementary members of a unit swage, said members being rotatably mounted in the supports by which they are respectively carried, means actuating said supports to cause said swage members to close on a joint to be swaged, the means for actuating one of said supports comprising a cam and intermediate connections the said cam having a succession of relatively small elevations so positioned as to impart a pulsating action to the pressure of the swage member carried by the support last mentioned, and means for causing said unit swage to rotate on and about said joint during the application of said pressure.

35. In a welding machine, means for securing a part having a welded joint, a pair of movable swage supports, each carrying one of the complementary members of a unit swage, said members being rotatably mounted in the supports by which they are respectively carried and turning and rotating on a common center, means actuating said supports to cause said swage members to close on a joint to be swaged, the said means also embracing means for causing a pulsating pressure on said joint.

36. In a welding machine, a pair of clamp jaws adapted to close on the ends of a round wire chain link having a welded joint, a swage of disc form composed of two complementary segmental members, the working surfaces of said members being arcual in cross-section but of less than a half circle and together forming a concave substantially cylindrical swaging surface co-axial with the unit swage, the chordal edges of said segmental members being provided with eccentrically positioned registering recesses, a pair of resiliently pivoted jaws provided with shanks, each jaw having at its free end a bearing adapted to receive one of said segmental members and wherein the same are mounted to rotate on their arcual perimeters, radially extending flanges on said members whereby lateral play in the bearings is prevented, a crank arm on one of said members, a circular track on the jaw carrying said member, said track being concentric with the bearing therein, a roller on said crank arm positioned to travel on said track as the said member is rotated in its bearing, means actuating said crank arm to produce oscillatory motion of said swage when said members are closed on a link joint, ball sockets on the inner walls of the flanges of the other of the said members, co-operating ball races in the adjacent sides of the jaw carrying said member, a ball caged in said socket, cams actuating said shanks to cause said jaws and with them said swage members to close at periodic intervals, on a joint to be welded, one of said cams being provided with succession of relatively small elevations adapted to come into operation when said jaws are thus closed whereby the pressure of the swaging members of said joint is accompanied by a succession of pulsations.

37. In a chain welding machine a clamp comprising a stationary jaw and a movable jaw, a pair of independently slidable electrodes, a swaging mechanism comprising a pair of jaws each of which carries one of a pair of complementary swages each of said swages being retained by a swage holder rotatably mounted in one of said jaws, a pair of chain elevating arms carrying horizontally alined and rotatably mounted cruciform dies, a slidably mounted vertically disposed fork adapted to engage a section of chain, means for advancing said movable jaw to clamp a link in fixed position against said stationary jaw and for pressing the free ends together in abutment, means for advancing said electrodes to close a circuit through the connection thus formed, means for still further pressing said ends together when the same have been heated by a current passed through them, the means for closing said swages on the weld and imparting to one of them a hammering action, means for oscillating said swages on said weld simultaneously with said hammering action, means for elevating and lowering said chain, means for rotating said chain in an arc of 90 degrees alternately in one direction and then in another, and means for retracting said fork while said chain is elevated, and advancing it when one of said dies is in lowered position.

38. In a chain welding machine a clamp comprising a stationary jaw and a movable jaw, a pair of independently and slidably mounted electrodes, means for advancing and retracting said electrodes to close a circuit through the abutting free ends of an unwelded link held by said clamp, a pair of jaws carrying rotatably mounted complementary swage holders in which are mounted a pair of complementary swages, means for closing said swages on a weld of a link while the same is held by said clamp, means for oscillating said swage holders about their centre of rotation when closed on a weld, a pair of chain elevating arms carrying rotatably mounted cruciform dies disposed normally in alinement with said clamp, means acting through said arms for elevating said cruciform dies out of alinement with said clamp and for lowering them into alinement therewith and for depressing one of said dies out of alinement with said clamp, a fork adapted to engage a section of chain carried by said cruciform dies when the last mentioned die is in depressed position, said fork being mounted on a slidable carriage adapted to reciprocate in the line of feed of said chain, means for causing said carriage to retract while said chain is above its depressed position and to advance a distance of one link when said chain is in depressed position and in engagment with said hook, and means for oscillating said cruciform dies synchronously in an arc of ninety degrees in one direction during one cycle of operations of said machine and in an arc of ninety degrees in an opposite direction during the succeeding cycle of operations.

39. In an electric chain welding machine, a chain feed and positioning mechanism comprising a pair of pivoted arms carrying at their free ends rotatably mounted dies in alinement with each other, crank arms on said dies, link clamp jaws intermediate said dies, cams operating on said arms to cause said dies to remain for a predetermined period in alinement with said clamp jaws, then to elevate the said free ends, then to lower them to said position of alinement, then to depress one of said arms below said position of alinement and then to return it to said position of alinement, a slidably mounted chain feed fork adapted to reciprocate in alinement with a chain carried by said dies when the last mentioned arm is in depressed position, means operating through said crank arms to cause said dies to rotate through a predetermined arc alternately in opposite direction with successive elevations of said arms, and means for causing said clamp jaws to close on a link when said dies are in said position of alinement and to secure said link during said predetermined period.

40. In an electric chain welding machine a chain feed mechanism including a pivoted arm having its free end bifurcated, the terminals being provided with bearings, alined dies mounted in said bearings, means operating on said arms to raise and lower said bearings, and a chain grabbing device mounted to reciprocate in parallelism with said dies, and in alinement with them when they are in lowered position.

41. In an electric chain welding machine, a chain feed mechanism including a pivoted arm having its free end bifurcated, the terminals carrying alined dies, means operating on said arms to raise and lower said dies, and a chain grabbing device mounted to reciprocate in alinement with said dies when they are in a predetermined position.

42. In an electric chain welding machine, a chain feeding and link positioning mechanism including a pivoted arm having its free end bifurcated, the terminals being provided with bearings, dies rotatably mounted in said bearings and in alinement with each other, means operating on said arm to raise and lower said dies, a chain grabbing device mounted to reciprocate between said dies and in alinement with them when they are in a predetermined position, and means for rotating said dies through a predetermined angle in alternation with the feeding stroke of said grabbing device.

43. In an electric chain welding machine a chain feeding and positioning mechanism which includes a pivoted arm having its free end bifurcated, the terminals being provided with bearings, dies mounted in said bearings and in alinement with each other, means operating through said arm to alternately raise and lower said bearings a chain grabbing hook mounted to reciprocate between said dies and in alinement with them when they are in lowered position, a link clamping device adapted to secure a link when said dies are in semi-elevated position, and means adapted to cause said dies to rotate alternately in one direction and then in the other, during successive elevated positions of said dies.

44. In an electric chain welding machine, a chain feeding and positioning means comprising a slidably mounted grab hook a pair of spaced alined chain securing dies, supports for said dies, means operating on said supports to advance said dies to a position of alinement with the motion of said hook and to retract them from said position.

45. In an electric chain welding machine, a chain feeding and positioning means comprising a slidably mounted grab hook a pair of spaced alined chain securing dies, supports for said dies, means operating on said supports to advance said dies to a position of alinement with the motion of said hook and to retract them from said position, means for causing said hook to reciprocate and link clamping means adapted to close on a link while said dies are not in said position of alinement.

46. In an electric chain welding machine, a chain feeding and positioning means comprising a slidably mounted grab hook a pair of spaced alined chain securing dies, supports for said dies, means operating on said supports to advance said dies to a position of alinement with the motion of said hook and to retract them from said position, means for causing said hook to reciprocate and link clamping means adapted to close on a link while said dies are not in said position of alinement, and means for causing said dies to rotate first in one direction and then in the other through a predetermined angle alternately during predetermined periods.

47. In an electric chain welding machine, a chain feeding and positioning means comprising a slidably mounted grab hook, a pair of spaced alined chain securing dies, supports for said dies, means of operating on said supports to advance said dies to a position of alinement with the motion of said hook and to retract them from said position; means for causing said hook to reciprocate, and means for causing said dies to rotate first in one direction and then in the other through a predetermined angle alternately during predetermined periods; and link clamping means adapted to close on a link while said dies are not in said position of alinement.

In testimony whereof, we have signed this specification.

CARLTON L. HOFF.
GIRARDUS G. NAUGLE.